United States Patent

Genisson et al.

[15] 3,650,722

[45] Mar. 21, 1972

[54] METHOD AND APPARATUS FOR FORMING BLANKS IN OPTICAL-QUALITY HOMOGENEOUS GLASS

[72] Inventors: Roger R. Genisson, Fontainebleau; Jean Pierre A. Thibieroz, Montigny sur Loing, both of France

[73] Assignee: Societe des Verreries Industrielles Reunies du Loing, Levallois Perret, France

[22] Filed: June 26, 1970

[21] Appl. No.: 50,209

[52] U.S. Cl. ............................ 65/65 A, 65/99 A, 65/182 R, 249/7 B, 249/82, 249/115
[51] Int. Cl. ......................................................... C03b 29/00
[58] Field of Search .............. 65/24, 66, 68, 26, 65 A, 182 R, 65/99 A; 249/78, 82, 105, 112, 115

[56] References Cited

UNITED STATES PATENTS

| | | | |
|---|---|---|---|
| 2,994,161 | 8/1961 | Bair | 65/26 X |
| 3,528,792 | 9/1970 | Wilson | 65/24 X |
| 1,553,773 | 9/1925 | Heal | 65/182 R |

Primary Examiner—Arthur D. Kellogg
Assistant Examiner—Robert L. Lindsay, Jr.
Attorney—Sughrue, Rothwell, Mion, Zinn & Macpeak

[57] ABSTRACT

A method for casting blanks of optical-quality glass disks in which the glass is cast on a bath of metallic material. The height of the metal material is varied during casting to ensure a constant distance between the casting tube and the top of the forming disk. Also during casting controllable heating and cooling means immersed within the bath of metallic material maintain a proper casting temperature at the top of the bath.

5 Claims, 5 Drawing Figures

Patented March 21, 1972

INVENTORS
ROGER R. GENISSON
JEAN PIERRE A. THIBIEROZ

BY Sughrue, Rothwell, Mion, Zinn & Macpeak
ATTORNEYS

3,650,722

METHOD AND APPARATUS FOR FORMING BLANKS IN OPTICAL-QUALITY HOMOGENEOUS GLASS

BACKGROUND OF THE INVENTION

This invention relates to a method for casting blanks of optical-quality glass disks whose diameter is relatively large with respect to their thickness.

It is known that, in making blanks of objects made of glass with very strong devitrification and especially objects made of glass requiring a particularly carefully produced optical quality, it is necessary to make certain blanks in the form of a plate or a disk of glass with a thickness that is small compared to the two other dimensions of the object. The preparation of these blanks presupposes the rapid clearance of the temperature zone leading to devitrification. This can be accomplished only by means of abrupt but controlled cooling during casting. It is necessary furthermore that the product obtained be in the most perfect state of homogeneity possible, in particular, and that the refraction index reveal only a very small variation from one point to the next, for example, less than $1 \times 10^{-5}$.

It seems that this problem of glass homogeneity is very closely dependent on the speed of the advance of the surface layer of the glass up to the lateral limits of the mold containing it.

SUMMARY OF THE INVENTION

It is the object of this invention to provide a casting method which overcomes the difficulties encountered so far in obtaining a thin, planar, homogeneous blank, in optical-grade glass.

According to this procedure, optical glass is cast on a suitable bath of metal or metal alloy, keeping the height of the free glass coming out of the casting tube essentially constant during the entire time the molten glass is being cast, by means of action on the horizontal level of the metal or alloy bath.

Furthermore, the apparatus of this invention requires:

a. heating elements, immersed into the metal bath, to prepare the casting conditions; and b. cooling elements also immersed in the metal bath, to evacuate the calories brought along by the hot glass, and thus to maintain the correct viscosity necessary for spreading conditions throughout the duration of casting. The amount of cooling provided here must be sufficient to evacuate the calories brought along by the hot glass (which is above devitrification temperature); however, the surface zone of the glass must continue to be heated by radiation so as to permit rapid spreading. The two operations must be conducted simultaneously to prevent a long stay at high temperatures and so as not to run into the devitrification phenomenon.

This method is not intended to achieve a surface state representing polishing by fire and therefore, it is not necessary to work in a neutral atmosphere.

The above characteristics, as well as the secondary characteristics and the advantages resulting from this, will emerge in greater detail in the specifications below, describing one way of implementing the method, with reference to the attached drawing, where:

DETAILED DESCRIPTION OF THE INVENTION

Figure 1:
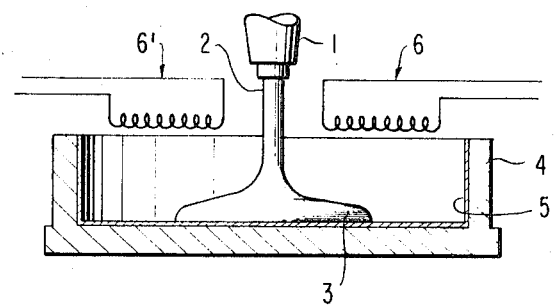
FIG. 1 represents, in a vertical cross section, a schematic device according to the present state of the art.

FIG. 1 shows a schematic representation of a casting device currently in use, showing the casting pipe 1 for a glass thread 2, brought to the suitable state of fluidity, so as to permit it to be spread in the form of a slab 3, which is of variable thickness, in a metallic mold 4 or in a mold made of graphite or any other refractory material, whose inside wall is preferably covered with a thin, flexible metallic sheet 5, fashioned to fit the inside contour of the mold to prevent the glass from becoming glued onto the walls of the mold cavity. In order to permit suitable spreading of the glass over the entire surface of the mold, a series of electrical heating coils 6, 6' are arranged all around the glass thread above the mold maintaining the molten glass surface under the best fluidity conditions.

This method, however, does not remedy all of the difficulties encountered in producing, in a homogeneous and perfectly controlled fashion, the quantity of calories necessary over a certain casting surface. For instance, if the bottom is too hot for the glass flow which spreads within the mold, a chemical reaction may cause glueing or degassing which brings about heterogeneity in the glass.

The difficulties mentioned earlier are particularly critical when trying to make a thin piece because the circumference of the glass flow, in the course of casting, is thicker than the middle portion of the disk. Furthermore, this circumference progresses relatively slowly, while being cooled very rapidly, without any possibility of accurately assuring the homogeneity of the glass in this peripheral zone whose front progresses while dispensing calories.

Figure 2:
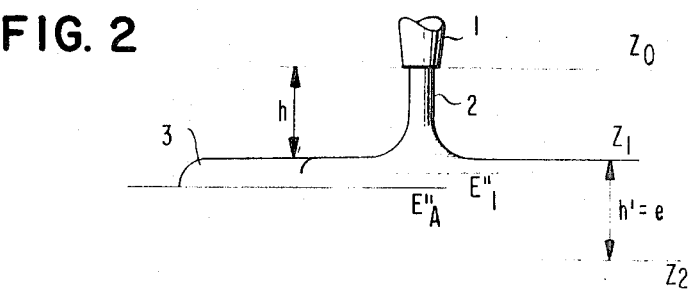
FIG. 2 represents an enlarged view of the thread of glass, in the course of casting.

A method was therefore perfected according to the invention which permits much easier control of the temperature of the surface over which the glass is cast. To do this as shown by FIG. 2, the distance $h$ is maintained essentially fixed, $h$ being the height of the free glass 2 between the upper level $Z_1$ of the glass flow and the level of the end of the casting pipe $Z_o$. This is achieved very easily by vertically moving, by a distance of $h'$, the average level of the surface on which the glass is cast from $Z_1$ to $Z_2$ gradually, as the casting proceeds, passing, for example, through the intermediate positions $E''A$, $E''_1$, which corresponds to the progression of the front of the glass casting flow. The final position $Z_2$ corresponds to the one for which all of the molten glass has been cast to obtain a disk with thickness $e$. It is preferable to assure the constancy of the height $h$ at about 2 mm. to avoid any disturbing turbulent movement. As regards the process of forming the disk represented in FIG 2, we can consider that it corresponds to the accomplishment of a superposition of layers which must be homogeneous with respect to each other.

Since the upper surface of the metal bath supports the glass casting flow, controlling the volume of metal within the bath necessarily controls the elevation of the plane of casting. It must be noted that the optimum casting height Ho is a function of the viscosity of the glass and it becomes smaller as the viscosity drops.

The use of the metal bath furthermore permits the solution of the problem of heat exchange between the glass bath and the support surface of the glass casting flow, because now the constancy of temperature and heat homogeneity at any point in the bath and in the contact between the glass and the metal, can be controlled by heating or cooling the bath, in which the convection movements are quite a bit faster than in solids, and hence a faster heat transfer is effected.

Figure 3:
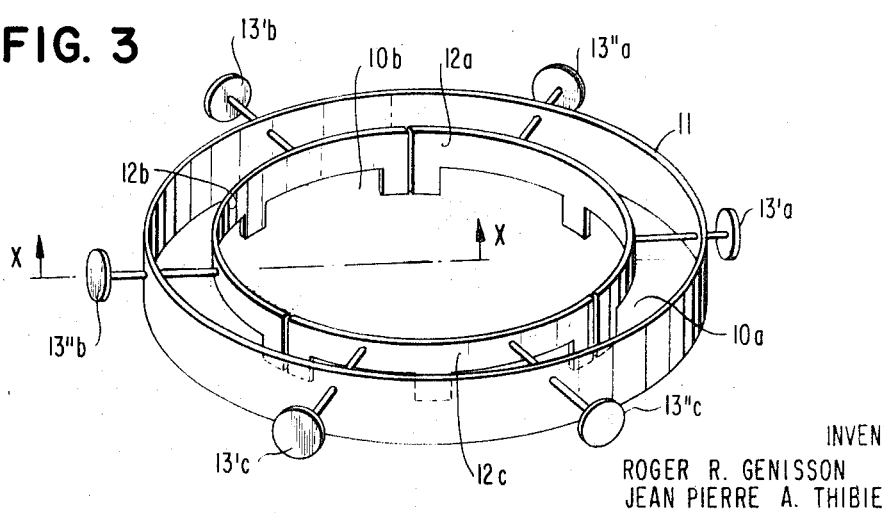
FIG. 3 represents, in perspective, one form of the casting device in accordance with the invention.

A form of the preferred implementation of this invention is represented in FIG 3, which consists of a metallic mold 11, containing a bath of molten metal, divided into a crown 10 a and a central zone 10 b. A circle consisting of the assembly of a plurality of sectors 12 a, 12 b, 12 c delimits the space 10 b inside the mold, which corresponds to the base surface of the glass disk which is to be cast on the bath of metal or molten alloy. A series of fixation rods 13'a, 13''a–13'b, 13''b–and 13'c, 13''c permits the positioning of the elements of the circle so as to bring them into contact and to place the system of sectors concentrically with respect to the metallic mold 11. The sectors are perforated on the level of their submerged portions so as to permit the flow of the metal toward the annular zone, gradually as the glass spreads.

Heating and temperature regulation equipment for the bath, known in itself, as well as a device for evacuation from the metal bath, to stabilize the height of the molten glass flow (shown in FIGS 4 and 5) complete the system.

Figure 4:
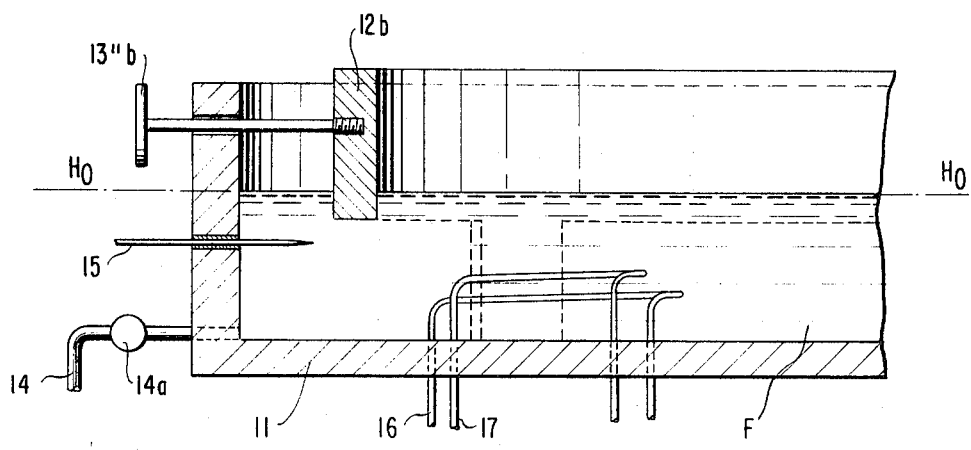
FIG. 4 represents, in a cross section, a partial enlarged view of the device of FIG 3, prior to the casting of the glass thread.

The description of the operation of the invention will now be given with reference to FIGS. 4 and 5.

First, since the casting flow is not accomplished in a neutral atmosphere; a surface oxidation occurs on the metal bath. This inconvenience is remedied by simply skimming the surface of the bath up to a point just before casting. Then the molten glass is cast on the molten metal bath F which has initial reference level Ho. The stabilization of the height of the flow is obtained by means of the evacuation of a fraction of the metal bath through pipe 14, by means of regulation of valve 14a.

This operation is performed at constant temperature under the surveillance of a thermocouple 15, by means of heating or cooling the bath with the help of a heating resistance 16 and a cooling tube 17 which are connected to thermocouple 15 by conventional control means (not shown) and by keeping constant the distance between the upper face of the casting flow and the end of the casting tube. At the end of casting, the glass flow is stopped by means of a water-cooled scoop 10 (not shown).

After casting the metal bath is slightly cooled in order to bring the glass to a temperature below its softening point. The the attachment rods 13'a to 13''c to the sectors of the circle are removed. The glass disk is thus released and can be extracted from the bath on which it floats by a mechanically immersed device, such as a large number of hooks, and it is then placed into an annealing furnace.

Figure 5:
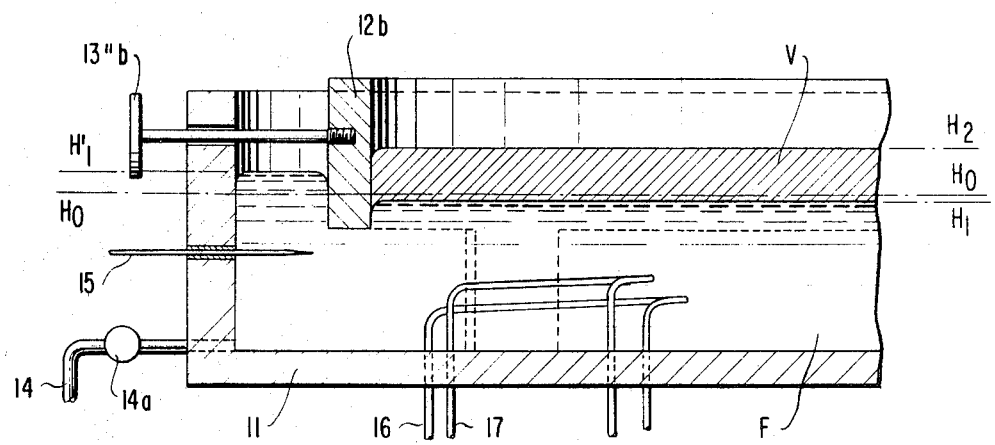
FIG. 5 represents, in cross section, a partial enlarged view of the device in FIG. 3, after the casting of the glass disk.

FIG 5 shows that, at the end of the casting of the disk, a portion of the metal bath is pressed into the ring-shaped region of the mold and that the free surface of the bath passes from Ho to H'', whereas the covered surface of the bath is situated at $H_1$ and the free surface of the glass is at $H_2$. These differences in level between the planes $H_1$ and $H_2$ take into account the different densities of the bath and the glass.

Further advantages of the present invention include:

The metallic bath easily and rapidly absorbs the vibrations resulting from the fall of the glass thread. Furthermore, the friction forces between the contact surface of the two, nonmixable surfaces, which are present here, are very much smaller than those which exist between a liquid and a solid. Thus the glass can spread over the entire surface of the metal bath in a relatively short time, thus reducing the cooling of the glass to a minimum and thus also reducing its viscosity variation in the course of this operation.

Also it must be noted that the use of the metal bath enables the operator to heat and regulate the temperature in a quite homogeneous fashion, without having to take precautions concerning the escape of heat from the mold, as was the case in the old method. It also permits the automatic accomplishment of perfect horizontality of the casting plane without intervention of any mechanical means.

Among the factors which are very important in the implementation of this method are the nature of the metal bath used and the temperature of the bath in the course of casting.

In order to prevent the formation of relatively deep wrinkles, resulting from the vibration of the bath in the course of casting and the propagation of the glass front on the metal, it is preferable to use a metal or metal alloy whose density, in the liquid state, will be on the order of twice the density of glass in fusion. For instance, lead or Pb/Sn alloys can be used.

It is also important to regulate the temperature of the metal bath at a value exceeding, by 20° to 30° C. the dilatometric softening point of the glass at the moment of casting.

We can thus cast disks for which the ratio of the thickness of the disk to the diameter is between one-twentieth and one-hundredth, for disk thicknesses which can drop below 30 mm. It was found that the method described above was in particular very well adapted for working optical glass whose density is between 3.5 and 6 and whose viscosity, during casting, can range from $10^0$ to $10^{2.5}$ poises.

Although this specification presents the best embodiment of this invention, it is quite evident that one can introduce numerous variations of form in terms of detail, so as to achieve an equivalent result, without going beyond the framework of the invention.

What is claimed is:

1. In a method for casting blanks of optical quality homogeneous glass including casting a free glass thread upon the surface of a mold, filling the mold with glass and removing the blank from the mold, the improvements comprising the steps of:
   a. Casting the molten glass on the surface of a bath of material which does not adhere to the glass;
   b. maintaining the free glass thread at an essentially constant height above the surface of the cast material by partial evacuation of said bath of material during casting which lowers the casting surface as the blank is built up;
   c. maintaining the temperature of the bath at a constant level throughout the casting process by removing excessive heat imparted to the bath by the molten glass;
   d. cooling the glass below the softening point before removing the blank from the mold.

2. The method of claim 1, wherein said material on the surface of which molten glass is casted is a molten metallic material.

3. The method of claim 2 wherein said molten metallic material is a Pb/SN alloy.

4. The method of claim 1, wherein the casting is accomplished at a temperature above the devitrification temperature of the glass, and the temperature of the metal bath is maintained throughout the entire casting time at a temperature exceeding by 20° to 30° the dilatometric softening point of the glass.

5. A device for casting blanks of optical-quality homogeneous glass which comprises:
   a. a metal mold, containing a bath of molten metallic material;
   b. a casting pipe disposed above said metal mold,
   c. a plurality of circular sectors within the mold defining an inside circular area corresponding to the maximum contour of the piece of cast glass and defining annular peripheral ring between said sectors and said mold each of said sectors being perforated to allow the liquid metal within the inside circular area to flow into said annular peripheral ring.
   d. means for immobilizing, in a contiguous position, the circular sectors;
   e. heating and cooling means immersed within said bath for regulating the temperature of the metal bath before, during and after glass casting; and
   f. means for evacuating a portion of said metal bath, whereby the height of said casting surface can be lowered with respect to said casting pipe.

* * * * *